United States Patent
Conn et al.

(10) Patent No.: US 6,641,920 B2
(45) Date of Patent: Nov. 4, 2003

(54) ULTRAVIOLET PROTECTED MULTI-LAYER STRUCTURES OF COPOLYESTER/POLYCARBONATE BLENDS

(75) Inventors: Roy Lee Conn, Highlands Ranch, CO (US); James Carl Williams, Blountville, TN (US); John Edward Christopher Willham, Kingsport, TN (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 10/071,176

(22) Filed: Feb. 8, 2002

(65) Prior Publication Data

US 2003/0165685 A1 Sep. 4, 2003

(51) Int. Cl.$^7$ ................................. B32B 27/36
(52) U.S. Cl. ................ 428/412; 525/146; 525/148; 525/439; 528/196; 528/198; 528/271; 528/272
(58) Field of Search .................. 528/196, 198, 528/271, 272; 525/146, 148, 439; 428/412

(56) References Cited

U.S. PATENT DOCUMENTS

| | | | |
|---|---|---|---|
| 3,028,365 A | 4/1962 | Schnell et al. | |
| 3,153,008 A | 10/1964 | Fox | |
| 3,334,154 A | 8/1967 | Kim | |
| 3,772,045 A | 11/1973 | Hamb | |
| 3,915,926 A | 10/1975 | Wambach | |
| 4,018,750 A | 4/1977 | Onizawa | |
| 4,123,436 A | 10/1978 | Holub et al. | |
| 4,188,314 A | 2/1980 | Fox et al. | |
| 4,391,954 A | 7/1983 | Scott | |
| 4,521,556 A | 6/1985 | Adams | |
| 4,619,976 A | 10/1986 | Morris et al. | |
| 4,740,581 A | 4/1988 | Pruett et al. | |
| 4,749,755 A | 6/1988 | Baysch et al. | |
| 4,749,772 A | 6/1988 | Weaver et al. | |
| 4,749,773 A | 6/1988 | Weaver et al. | |
| 4,749,774 A | 6/1988 | Weaver et al. | |
| 4,786,692 A | 11/1988 | Allen et al. | |
| 4,897,453 A | 1/1990 | Flora et al. | |
| 4,950,732 A | 8/1990 | Weaver et al. | |
| 5,045,596 A | 9/1991 | Laughner | |
| 5,194,523 A | 3/1993 | Small, Jr. et al. | |
| 5,207,967 A | 5/1993 | Small, Jr. et al. | |
| 5,239,020 A | 8/1993 | Morris | |
| 5,252,699 A | 10/1993 | Chamberlin et al. | |
| 5,254,610 A | 10/1993 | Small, Jr. et al. | |
| 5,340,910 A | 8/1994 | Chamberlin et al. | |
| 5,372,864 A | 12/1994 | Weaver et al. | |
| 5,384,377 A | 1/1995 | Weaver et al. | |
| 5,399,595 A | 3/1995 | Sublett et al. | |
| 5,420,212 A | 5/1995 | Light | |
| 5,461,120 A | 10/1995 | Mason et al. | |
| 5,478,896 A | 12/1995 | Scott | |
| 5,482,977 A | 1/1996 | McConnell et al. | |
| 5,654,347 A | 8/1997 | Khemani et al. | |
| 5,674,928 A | 10/1997 | Chisholm et al. | |
| 5,681,905 A | 10/1997 | Mason et al. | |
| 5,681,918 A | 10/1997 | Adams et al. | |
| 5,731,389 A | 3/1998 | Bailly et al. | |
| 5,907,026 A * | 5/1999 | Factor et al. | 528/196 |
| 5,942,585 A | 8/1999 | Scott et al. | |
| 6,037,424 A | 3/2000 | Scott et al. | |
| 6,448,334 B1 * | 9/2002 | Verhoogt et al. | 525/67 |

FOREIGN PATENT DOCUMENTS

| | | |
|---|---|---|
| JP | 2000063641 A | 2/2000 |
| JP | 2000238223 A | 9/2000 |
| JP | 2000318107 A | 11/2000 |
| JP | 2000327890 A | 11/2000 |
| JP | 2000327893 A | 11/2000 |

OTHER PUBLICATIONS

"Plastics Additives" edited by Geoffrey Pritchard, pp. 427–441 (1998) published by Chapman and Hall, New York, NY.

"Polymer Additives" edited by J.E. Kresta pp. 1–93 (1984) published by Plenum Press, New York, NY.

* cited by examiner

Primary Examiner—Terressa M. Boykin
(74) Attorney, Agent, or Firm—B. J. Boshears; Bernie Graves

(57) ABSTRACT

There is described an ultraviolet protected multi-layer structure comprising a layer produced from a copolyester/polycarbonate blend, and a protective UV absorbing compound-containing polycarbonate cap layer. Also described is a process for producing the multi-layer structures, and articles of manufacture produced from the multi-layer structures.

10 Claims, No Drawings

ULTRAVIOLET PROTECTED MULTI-LAYER STRUCTURES OF COPOLYESTER/ POLYCARBONATE BLENDS

FIELD OF THE INVENTION

This invention relates to multi-layer structures comprising a film, sheet or profile produced from specific blends of polycarbonates and polyesters, that is provided with an outer layer, on one or more sides, with a surface cap layer comprising a polycarbonate and an ultraviolet (UV) absorbing component.

BACKGROUND OF THE INVENTION

Certain blends of polycarbonates and copolyesters can be formed into films that are thermoformable without the necessity of drying the films prior to thermoforming. However, the films are subject to the effects of ultraviolet (UV) radiation.

It is accordingly an object of this invention to provide UV radiation protection to the film, sheet or profile formed from the blends of polycarbonates and copolyesters.

It is a further object of this invention to provide a surface functionality of a polycarbonate to the film, sheet or structure formed from the blends of polycarbonates and copolyesters.

It is a further object of this invention to provide a UV protected multi-layer structure that may be used as regrind.

It is a further object of this invention to provide a UV protected multi-layer structure that may be thermoformed without the need for pre-drying the structure and that will not result in the formation of blisters.

It is a further object of this invention to provide a UV protected multi-layer structure that has increased heat deflection temperature (HDT).

SUMMARY OF THE INVENTION

In accordance with the present invention, a multi-layered structure is prepared as follows. A film, sheet or profile is prepared from a blend or composition defined as follows:

The blend or composition comprises from about 15 to about 40 weight percent (%) polycarbonate and from about 60 to about 85 weight % copolyester. Any polycarbonate may be used. The specific copolyesters used are based on an acid component comprising terephthalic acid, naphthalenedicarboxylic acid, cyclohexanedicarboxylic acid, or mixtures thereof containing from 15 to about 35 mol percent (%) isophthalic acid and a glycol component comprising from about 80 to 100 mol % 1,4-cyclohexanedimethanol.

A UV protective layer, comprising at least one, or more, polycarbonate and at least one, or more, UV absorbing compound, is typically coextruded or laminated onto at least one side of the film, sheet or profile formed from the blend of polycarbonate and copolyester.

The UV protected multi-layer structures herein may be used for many applications, such as for skylights, signs, glazing, laminates, packaging food, clothing, pharmaceutical products, multi-wall sheets, and the like. Accordingly, the present invention is directed to articles of manufacture incorporating the multi-layered structures of the present invention.

DETAILED DESCRIPTION OF THE INVENTION

In accordance with the present invention, a multi-layered structure is prepared as follows. A film, sheet or profile is prepared from a blend or composition defined as follows:

The blend or composition comprises from about 15 to about 40 weight percent (%) polycarbonate and from about 60 to about 85 weight % copolyester. Any polycarbonate may be used. The specific copolyesters used are based on an acid component comprising terephthalic acid, naphthalenedicarboxylic acid, cyclohexanedicarboxylic acid, or mixtures thereof containing from about 15 to about 35 mol (%) isophthalic acid and a glycol component comprising from about 80 to 100 mol % 1,4-cyclohexanedimethanol.

A UV protective layer, comprising at least one, or more, polycarbonate and at least one, or more, UV absorbing compound, is typically coextruded or laminated onto at least one side of the film, sheet or profile formed from the blend of polycarbonate and copolyester.

The UV protected multi-layer structures herein may be used for many applications, such as for skylights, signs, glazing, laminates, packaging food, clothing, pharmaceutical products, multi-wall sheets, and the like. Accordingly, the present invention is directed to articles of manufacture incorporating the multi-layered structures of the present invention.

In more detail, the blend or composition comprises at least one, or more, polycarbonate(s) and at least one, or more, of the specified copolyester(s). The amounts of components of all blends or compositions herein are provided in weight percent (%), based on the weight of the blend or composition.

The polycarbonate component of the blend or composition may be any polycarbonate. The polycarbonates suitable for use in the present invention are well known and are generally commercially available. The polycarbonates may be branched or linear. Suitable polycarbonates are exemplified, but not limited to, those described in U.S. Pat. Nos. 3,028,365; 3,334,154; 3,915,926; 4,897,453; 5,674,928; and 5,681,905, all of which are incorporated herein by reference. The polycarbonates may be prepared by a variety of conventional and well known processes which include trans-esterification, melt polymerization, interfacial polymerization, and the like. The polycarbonates are generally prepared by reacting a dihydric phenol with a carbonate precursor, such as phosgene. Suitable processes for preparing the polycarbonates of the present invention are described, for example, in U.S. Pat. Nos. 4,018,750; 4,123,436; and 3,153,008. Preferred polycarbonates for use in the present invention are aromatic polycarbonates, with aromatic polycarbonates based on bisphenol-A [2,2-bis(4-hydroxyphenyl)propane], such as are obtained by reacting bisphenol-A with phosgene, being more preferred. Diphenyl carbonate or dibutyl carbonate may be utilized in place of phosgene.

In the blend or composition, the polycarbonate is present in an amount ranging from about 15 to about 40 weight %, based on the weight of the total blend or composition, and the copolyester is present in an amount ranging from about 60 to about 85 weight %, both based on the weight of the total blend or composition. The polycarbonate is preferably present in an amount of about 20 to 28 weight percent and the copolyester is preferably present in an amount of about 80 to 72 weight percent, based on the weight of the total blend or composition.

The copolyester component of the blend or composition of the present invention is at least one, or more of poly(1,4-cyclohexylene-dimethylene terephthalate) (PCT), poly(1,4-cyclohexylenedimethylene naphthalenedicarboxylate) (PCN), poly(1,4-cyclohexylenedimethylene 1,4-cyclohexanedicarboxylate) (PCC) copolyesters, or mixtures thereof, containing about 15 to about 35 mol % isophthalic acid with a preferred amount being from 20 to about 30 mol % isophthalic acid. The copolyester comprises an acid component comprising from about 65 to about 85 mol percent of a dicarboxylic acid selected from terephthalic acid, naphthalenedicarboxylic acid, 1,4-cyclohexanedicarboxylic acid or mixtures thereof; from about 15 to about 35 mol percent isophthalic acid; and from 0 to about 20 mol percent of other dicarboxylic acid units. The copolyester comprises a glycol component of about 80 to 100 mol percent 1,4-cyclohexanedimethanol (CHDM) and from 0 to about 20 mol percent other glycol units. The total dicarboxylic acid units is equal to 100 mol percent, the total glycol units is equal to 100 mol percent and the total polyester units is equal to 200 mol percent.

The CHDM and 1,4-cyclohexanedicarboxylic acid moieties used to prepare the copolyesters can be trans, cis or trans/cis mixtures of isomers. Any of the naphthalenedicarboxylic acid isomers or mixtures of isomers can be used with the 1,4-, 1,5-, 2,6-, and 2,7-isomers being preferred.

The other dicarboxylic acid(s) that can be used herein in amounts of from 0 to about 20 mol percent have from about 4 to about 40 carbon atoms. Exemplary of the other dicarboxylic acids suitable for use herein are sulfoisophthalic, sulfodibenzoic, succinic, glutaric, adipic, sebacic, suberic, dimer, dodecanedioic, and the like, or mixtures thereof.

The other glycol unit(s) that can be used herein in amounts of from 0 to about 20 mol percent contain from about 3 to about 12 carbon atoms. Exemplary of the other glycols suitable for use herein are propylene glycol, 1,3-propanediol, 1,4-butanediol, 1,5-pentanediol, 1,6-hexanediol, neopentyl glycol, 2,2,4,4-tetramethyl-1,3-cyclobutanediol, diethylene glycol, and the like, or mixtures thereof.

With respect to the composition of the copolyester, the glycol component preferably comprises 100 mol percent of 1,4-cyclohexanedimethanol. In another preferred embodiment, the acid component of the copolyester comprises 65 to 85 mol percent terephthalic acid. In a most preferred embodiment, the copolyester composition comprises 100 mol percent 1,4-cyclohexanedimethanol, about 26 mol percent isophthalic acid, and about 74 mol percent terephthalic acid.

The copolyester component of the blend of the present invention preferably has an inherent viscosity (I.V.) of from about 0.5 to about 1.5 dL/g, determined in accordance with ASTM Test Method D2857-70.

The copolyester component of the blends of the present invention may be prepared by processes well known in the art. For example, the copolyester components may be readily prepared by batch or continuous processes. These copolyesters are typically made in melt phase polycondensation reactions. However, it is possible to use solid phase build up techniques well known in the art, if desired.

One suitable method includes the step of reacting one or more dicarboxylic acids with one or more glycols at a temperature of about 100° C. to about 315° C. at a pressure of about 0.1 to 760 mm (millimeter) mercury for a time sufficient to form a polyester. For methods of producing polyesters, reference is made to U.S. Pat. No. 3,772,405, the contents of which are incorporated herein by reference.

Furthermore, the copolyesters of the present invention can be prepared by condensation of the appropriate raw materials using either batch or continuous operations well known in the art. It is possible to use dicarboxylic acids or their corresponding lower alkyl esters such as the methyl esters in the polymerization reactions. When using the methyl esters, it is desirable to use titanium, manganese or zinc based catalysts in the initial ester interchange step and titanium, antimony, germanium, or tin based catalysts for the polycondensation step. A preferred catalyst is based on about 10 to about 100 ppm of titanium and 0 to about 75 ppm manganese. During the buildup phase, it is desirable to add from about 10 to about 90 ppm of a phosphorus-containing compound to serve as a color stabilizer. Typically, a phosphorus-containing additive is added in the form of a phosphate, such as phosphoric acid or an organic phosphate ester. Typically, lower amounts of phosphorus inhibitors are employed when using lower amounts of titanium in the catalyst system. Suitable phosphate esters for use in preparing the copolyesters of the invention include, but are not limited to, ethyl acid phosphate, diethyl acid phosphate, arylalkyl phosphates and trialkyl phosphates such as triethyl phosphate and tris-2-ethylhexyl phosphate.

The blends of the present invention may comprise more than one polycarbonate, and more than one copolyester, if desired.

The polycarbonate/copolyester blends of the present invention can be prepared by any technique known in the art. For example, the blends can be prepared by making pellet blends that are then extruded and pelletized. Alternately, pellets of polycarbonate and copolyester may be fed separately and the melts mixed prior to the extrusion operation to form film, sheeting or profiles. The melt blending and extrusion operations are generally conducted at temperatures ranging from about 425° F. (218° C.) to about 580° F. (304° C.).

Alternatively, the polycarbonate and copolyester components may be weighed and placed in a plastic bag. The bag is shaken or tumbled by hand to blend the components. This blend can then be fed to an extruder to produce sheeting or film. This technique is useful for small-scale work. In larger scale work, the polycarbonate and copolyester components may be placed in separate hoppers and then metered into the extruder to provide the appropriate blend composition. Further, the polycarbonate and copolyester components may be melt blended in a melt mixing tank, in a sigma blade mixer or in a single or twin screw extruder followed by pelletization or granulation of the blend. This melt mixed blend may then be extruded into film or sheeting.

Further, the blends can be made by methods which include the steps of blending the polycarbonate and copolyester portions of the present invention at a temperature of about 25° C. (77° F.) to 300° C. (572° F.) for a time sufficient to form a blend composition. Suitable conventional blending techniques include the melt method and the solution-prepared method. Other suitable blending techniques include dry blending and/or extrusion.

The melt blending method includes blending the polymers at a temperature sufficient to melt the polycarbonate and copolyester portions, and thereafter cooling the blend to a temperature sufficient to produce a blend. The term "melt" as used herein includes, but is not limited to, merely softening the polymers. For melt mixing methods generally known in the polymers art, see Mixing and Compounding of Polymers (I. Manas-Zloczower & Z. Tadmor eds, Carl Hanser Verlag publisher, New York 1994).

The solution-prepared method includes dissolving the appropriate weight/weight ratio of copolyester and polycarbonate in a suitable organic solvent such as methylene chloride, mixing the solution, and separating the blend composition from solution by precipitation of the blend or by evaporation of the solvent. Solution-prepared blending methods are generally known in the polymers art.

The blends can also contain antioxidants, conventional flame retardants such as phosphorus or halogen compounds, or fillers such as talc or mica, or reinforcing agents such as glass fiber, or carbon fiber. Additives such as pigments, dyes, stabilizers, plasticizers, nucleating agents, and the like, can also be used in the polyesters, polycarbonates, and blends to further modify the properties of the blends.

Blends of polycarbonate and copolyesters tend to exhibit a yellow coloration. The yellow coloration can be suppressed by adding a phosphite stabilizer to the blend. The phosphite stabilizer may be added as the polycarbonate and the copolyester are extruded. In a preferred embodiment, there is prepared a masterbatch of a suitable phosphite stabilizer in either of the polymer components of the blend. The masterbatch contains from about 2 to about 20 weight percent (%) of the phosphite stabilizer. One suitable stabilizer is distearyl pentaerythritol diphosphite. The resultant polymer blends will generally contain from about 0.1 to about 0.5 weight % phosphite stabilizer.

The compositions may be fabricated into films by any technique known in the art. For example, films may be produced by the well known cast film, blown film and extrusion coating techniques, the latter including extrusion onto a substrate.

The UV protective layer comprises at least one, or more, of any polycarbonate and at least one, or more, of any UV absorbing compound. In preparing the compositions from which the UV protective layers are formed, any polycarbonate is suitable for use. The polycarbonates may be branched or linear. Suitable polycarbonates are exemplified, but not limited to, those described in U.S. Pat. Nos. 3,028,365; 3,334,154; 3,915,926; 4,897,453; 5,674,928; and 5,681,905, all of which are incorporated herein by reference. The polycarbonates may be prepared by a variety of conventional and well known processes which include transesterification, melt polymerization, interfacial polymerization, and the like. The polycarbonates are generally prepared by reacting a dihydric phenol with a carbonate precursor, such as phosgene. Suitable processes for preparing the polycarbonates of the present invention are described, for example, in U.S. Pat. Nos. 4,018,750; 4,123,436; and 3,153,008. Preferred polycarbonates for use in the present invention are aromatic polycarbonates, with aromatic polycarbonates based on bisphenol-A [2,2-bis(4-hydroxyphenyl)propane], such as are obtained by reacting bisphenol-A with phosgene, being more preferred. Diphenyl carbonate or dibutyl carbonate may be utilized in place of phosgene.

Any UV absorbing compound, suitable for use in polycarbonates, may be utilized in preparing the UV protective layer. Exemplary UV absorbers suitable for use herein are hindered amine light stabilizers (HALS), 2-hydroxybenzophenones such as 2-hydroxy4-n-octoxybenzophenone, 2-hydroxyphenylbenzotriazoles such as 2-(2-hydroxy-5-methylphenyl)-2H-benzotriazole, 2-hydroxyphenyl-S-triazines such as 2-(2-hydroxy-4-methoxyphenyl)-4,6-dimethyl-S-triazine, phenyl substituted p-hydroxybenzoates, the cetyl ester of 2,6-ditert.butyl-4-hydroxybenzoate, hindered piperidine compounds such as bis(2,2,6,6-tetramethyl-4-piperidinyl)sebacate, certain metal chelates such as tris(dibenzoylmethanato) chelates of Cr or Fe, nickel oxime chelates such as nickel(II) 2,2'-thiobis(4-tert.octylphenolato)-n-butylamine and the like. Examples of commercially available UV absorbers include, but are not limited to: Cyasorb 1164, 3638, 5411 supplied by Cytec Industries Inc., Tinuvin 234 and 326 supplied by Ciba and MIXXIM BB/100 supplied by Fairmount Chemical Company.

If desired, combinations of UV absorbing compounds may be used. Further information on UV absorbers may be found in "Plastics Additives" edited by Geoffrey Pritchard, pp. 427–441 (1998) published by Chapman and Hall, New York, N.Y. and "Polymer Additives" edited by J. E. Kresta (1984) published by Plenum Press, New York N.Y.

The amount of UV absorber to be incorporated in the UV protective layer is any amount that is required to render UV radiation protection. Generally, the UV absorber will be present in the UV protective layer in an amount ranging from about 0.25 to about 15 weight %, based on the composition. The UV absorber may be incorporated in the polycarbonate utilizing any known manner, such as by physical mixing the components.

In preparing the UV protective layer, other conventional additives may be incorporated. For example, there may be added stabilizers, flame retardants, pigments, colorants, finely divided minerals and other additives.

The UV protective composition comprising polycarbonate and UV absorber may be formed into a film by any known manner, such as extrusion. Preferably, the UV protective layer is formed, by coextrusion, on at least one, or more, sides of the film formed from the blends or compositions. In general, the UV protective layer has a thickness of about 1 mil (25 microns) to about 10 mils (250 microns).

The UV protective layer may be applied to the film, sheet or profile prepared from the blend of polycarbonate and polyester by any suitable technique. Exemplary of the techniques are coextrusion, lamination or coating. Also suitable for application of the UV protective layer to the film, sheet or profile is solvent coating or casting technology. Preferably, the UV protective coating is either laminated or coextruded onto the film, sheet or profile formed from the blend of polycarbonate and copolyester. The process of coextrusion is most preferred, and the following is a brief description of the well known and established procedure of coextrusion.

Coextrusion is the combining of multiple layers of different or similar plastic polymers through a specially designed feedblock manifold that will allow the final product to perform as a multifunctional substrate that reflects the properties of said polymers in the structure. The feedblock will receive polymers from extruders or other types of plastics processing equipment, combine the layers without mixing the layers, and then will supply this combination of layers to a die or other piece of equipment used to form film, sheet, profiles or other extruded products for various shapes and applications. Coextrusion feedblocks are commonly manufactured pieces of equipment used in the plastics industry and are produced by known and qualified suppliers.

The UV protected multi-layer structures of the present invention are characterized by having many useful properties. For example, the UV protected multi-layer structures have resistance to ultraviolet radiation. The UV protected multi-layer structures of the present invention also possess the surface functionality of a polycarbonate in respect of adhesion of the decoration. The UV protected multi-layer structures are usable as regrind to provide feed stock for new sheet or film. The UV protected multi-layer structures may be thermoformed without pre drying, and in the absence of formation of blisters. Also, the Heat Deflection Temperature (HDT) of the UV protected multi-layer structures of the invention is increased as a result of the presence of the polycarbonate UV protective layer.

As an advantage mentioned above, the UV-protected multi-layer structures of the present invention may be reground to be used as feed stock for preparing new sheet or film or profiles. In this respect, typically in the manufacture of extruded polymer products, a portion of the generated parts are not usable due to quality controls. These parts are often reground and blended back into the feed hopper of the extruder where they are again extruded into useful parts. In the past the use of other cap-layered structures has often led to contamination of the feed stock by the recycled coextruded sheet. However, the polycarbonate cap layer when reground and re-extruded back into useful parts has not led to a significant loss of key properties of the finished parts. Generally, when a different material is used as a cap layer on a sheet or film and that material is recycled back to the feed, it will cause the resultant sheet or film to lose the desired transparency, color, and mechanical properties, and may also cause the formation of undesirable inclusions in the resultant sheet or film.

D1238, and 130 pounds (58.9 kilograms) of distearyl pentaerythritol diphosphite were charged to a JAYGO Model No. JRB100 ribbon blender, having a working capacity of 3000 pounds of polycarbonate powder. The weight ratio of polycarbonate to diphosphite was 95:5. The ribbon blender was agitated at a rate of 25 rpm (revolutions per minute) while adding the diphosphite and for a further 10 minutes. There was obtained 2600 pounds (1179 kilograms) of undried, powdered concentrate, that was then pelletized as follows. A 40 mm (millimeter) Werner-Pfleiderer Model ZSK-40 twin screw extruder was operated at a screw speed of 250 rpm, and at barrel set temperatures as indicated in the Table 1 below.

TABLE 1

| Barrel Zone | 1 (feed) | 2 | 3 | 4 | 5 | 6 | 7 | 8 | 9 (die) |
|---|---|---|---|---|---|---|---|---|---|
| Temperature ° C. | Heater Off | Heater Off | 180 | 220 | 220 | 220 | 220 | 220 | 230 |
| (° F.) | | | 356 | 428 | 428 | 428 | 428 | 428 | 446 |

Another advantage attributable to the UV-protected multi-layer structures of the present invention results from the fact that the structures have a surface of polycarbonate. This allows the multi-layered structures to be decorated by means of solvent-based paints, inks, and the like.

Another advantage of the present UV protected multi-layer structures is the ability to be thermoformed without drying, without the formation of blisters or bubbles. Most polycarbonate sheet will form blisters if thermoformed without first drying the sheet or film.

In addition, the UV protected multi-layer structures of the present invention are characterized by having an increased Heat Deflection Temperature (HDT), according to ASTM Test Method D648, as a result of the presence of the polycarbonate protective cap layer.

The invention will be more readily understood by reference to the following examples. There are, of course, many other forms of this invention which will become obvious to one skilled in the art, once the invention has been fully disclosed and it will accordingly be recognized that these examples are given for the purpose of illustration only, and are not to be construed as limiting the scope of this invention in any way.

EXAMPLES

In the following examples, the test procedures listed below were used in evaluating the properties of the UV protected multi-layer structures herein.

| Heat Deflection Temperature | ASTM D648 |
|---|---|
| Paint Adhesion | ASTM D3359-97 |

Example 1

In this Example 1 there was utilized as a stabilizer the following composition, prepared as described herein. At ambient temperature, 2470 pounds (1120 kilograms) of Bayer's MAKROLON 5308 polycarbonate powder, which is based on bis(phenol) A and has melt flow rates at 300° C. and 1.2 kg load of 11.5 grams/10 minutes by ASTM method Resulting melt temperature exiting the die was 240° C. (464° F.) using a six-hole die (individual die hole size: 3.61 mm or 0.142 inch). The powdered, blended mixture of polycarbonate (95%) and diphosphite (5%) was metered to the feed zone of the extruder by means of an Accu Rate MDL 8000W loss-in-weight feeder, produced by Accu Rate, Inc. The feeder was operated at a rate of 150 pounds per hour (68 kilograms per hour) with the barrel vented at the seventh zone. The six strands or rods exiting from the extruder die were conducted through a 25° C. (77° F.) cooling water bath and cut on a Cumberland Model 6 Quietizer pelletizer, produced by the Cumberland Engineering Division of John Brown, Inc. The cylindrical concentrate pellets were then classified according to size on a Carrier Model IDLM-1-240-S shaker deck, produced by Carrier Vibrating Equipment Company, before being packaged in polyethylene-lined, fiberboard containers for subsequent use. This blend of polycarbonate and diphosphite is referred to herein as the stabilizer concentrate.

In carrying out Example 1, a blend was produced comprising 5% by weight, of the above described stabilizer concentrate and 95%, by weight, of a blend or composition of a specified polycarbonate and a specified copolyester. The blend or composition comprised 23% by weight of the polycarbonate and 77% by weight of the copolyester. The specified polycarbonate was Bayer's MAKROLON 1804 Tint 1121, which is based on bis(phenol) A and has melt flow rate at 300° C. and 1.2 kg load of 6 grams/10 minutes by ASTM method D1238. The specified copolyester was comprised of about 100 mol percent 1,4-cyclohexanedimethanol (CHDM), 26 mol percent isophthalic acid (IPA), and 74 mol percent terephthalic acid (TPA) having an I.V. of 0.72 dL/g. Prior to blending, the polycarbonate was dried in a desiccated air dryer at 250° F. (121° C.) for 4 to 6 hours. The copolyester was dried, prior to blending, in a separate desiccated air dryer at 150° F. (65.6° C.) for 4 to 6 hours. 22 pounds (10 kilograms) of polycarbonate, 73 pounds (33.2 kilograms) of copolyester, and 5 pounds (2.3 kilograms) of stabilizer concentrate were blended together using a Conair WSB-240 weigh scale pellet blender. The blend of polycarbonate, copolyester, and stabilizer concentrate was then vacuum transferred from the Conair WSB-240 blender to the hopper of a 3.5 inch (90 millimeter) Breyer sheet extrusion line, Equipment No. 190-63846-1. The Breyer extrusion system was controlled by electrical heaters that were set at the following set points shown in Table 2.

TABLE 2

| Extruder Zone | Temperature degrees F (C) | Satellite Extruder Zones | Temperature degrees F (C) | Extruder Zone | Temperature degrees F (C) |
|---|---|---|---|---|---|
| Extruder zone 1 | 525 (274) | Extruder zone 1 | 515 (288) | Die bottom zone 23 | 475 (246) |
| Extruder zone 2 | 525 (274) | Extruder zone 2 | 515 (268) | Die bottom zone 25 | 478 (248) |
| Extruder zone 3 | 450 (232) | Extruder zone 3 | 515 (268) | Die bottom zone 27 | 478 (248) |
| Extruder zone 4 | 450 (232) | Extruder zone 4 | 515 (268) | Die bottom zone 29 | 475 (246) |
| Extruder zone 5 | 450 (232) | Adapter | 515 (268) | Die bottom zone 31 | 475 (246) |
| Extruder zone 6 | 450 (232) | Pipes | 515 (268) | Die top zone 24 | 475 (246) |
| Extruder zone 7 | 450 (232) | | | Die top zone 26 | 478 (248) |
| Screen changer | 450 (232) | | | Die top zone 28 | 478 (248) |
| Adapter | 450 (232) | | | Die top zone 30 | 475 (246) |
| Gear pump | 450 (232) | | | Die top zone 32 | 475 (246) |
| Adapter | 450 (232) | | | | |
| Coex block | 450 (232) | | | | |
| Adapter | 450 (232) | | | | |

The extrusion screw used was a 33:1 L/D barrier type, two-stage screw produced by Breyer. The extruder was vented in zone 5 using a vacuum to remove any gases that may form in the melted plastic during the extrusion process. The screw was internally cooled with 65° F. (18.3° C.) water in the feed section only. The blend of pellets was extruded into sheet using conventional extrusion practices to produce a sheet product that was 0.118 inches (3 millimeters) thick. The extruder, running at 71 revolutions per minute (rpm's), processed the melt blend through a screen pack, a Maag gear pump running at 43 rpm, a Breyer coextrusion feedblock and then through a 52 inch (1320 millimeter) wide Cloeren heavy gauge sheet die.

The above material blend was coextruded with a protective UV cap layer. The two-layer sheet was protected from harmful ultraviolet radiation usually encountered in outdoor weathering environments. The UV cap material was Bayer PC (polycarbonate) UV Grade: DP1-1092, which was dried at 250° F. for 4 to 6 hours.

The UV cap layer material was extruded using a 1.37-inch (35 mm) Breyer satellite extruder. The screw was internally cooled with 65° F. (18.3° C.) water in the feed section only. The screw used is a standard barrier screw used to extrude most copolyester and polycarbonate materials. This extruder pumped the melted UV material through a heated piping system into a Breyer coextrusion feedblock. The satellite extruder was running at 20 revolutions per minute (rpm's).

The materials were extruded with the UV cap layer being on the bottom side of the sheet. The roll temperatures were controlled at 185° F. (85° C.) for the first roll, 190° F. (88° C.) for the second roll, and 243° F. (117° C.) for the third roll. The conveyer linespeed was 34.60 inches per minute (0.950 meters per minute). The output from the main extruder was approximately 620 pounds per hour (281 kilograms per hour). The sheet was then transferred down the conveyer system through a set of edge trim knives to a Breyer cross cut saw where the pieces of sheet were cut into 2 ft.×4 ft. (0.610 m×1.220 m) pieces for testing purposes.

The data obtained from testing the resulting multi-layer structure is reported hereinbelow. As is apparent, the multi-layered structure comprises a layer of the copolyester/polycarbonate blend described herein, coextruded with a polycarbonate cap layer. The multi-layer structure having a polycarbonate surface, may be decorated.

The following data shows that paint will adhere to the multi-layer structure. The test employed was ASTM D3359-97, that measures the amount of paint that is peeled away from a substrate after a crosshatch pattern is applied to the coating surface. A piece of tape is applied to the crosshatch area and then pulled away to attempt to remove the coating. A 5B rating indicates that 0% of the coating was removed. A 3B rating indicates that between 5 and 15% of the coating was removed.

The paints used were Lacryl sign paints produced by Spraylat Corporation. The Lacryl 200T and 205T are two different solvents used to blend with the paints that are needed for the spraying and application process. White and blue pigments are listed as the colors used in the evaluation. The alloy listed is the copolyester/polycarbonate blend coextruded with a polycarbonate cap layer as produced in Example 1. The data is reported in Table 3.

TABLE 3

| Material - Solvent, Color | Dry Peel Test |
|---|---|
| Alloy with PC cap layer - 200T, White | 5B |
| Alloy with PC cap layer - Alloy - 205T, Blue | 5B |

It is expected that the paint will adhere to the multi-layer structure to a greater degree than to a monolayer formed of the copolyester/polycarbonate blend without a polycarbonate UV cap layer.

From the further data herein, it will be observed that the Heat Deflection Temperature (HDT) of the multi-layer structure of the present Example 1 is increased, as compared to the HDT of a monolayer formed from the polyester/polycarbonate blend of Example 1, but without the polycarbonate UV cap layer.

In carrying out the evaluation of HDT, there was utilized a multi-layer structure formed from the copolyester/polycarbonate blend of Example 1, having a thickness of 3 mm (millimeters), and a polycarbonate cap layer having a thickness of 75 microns coextruded on one side thereof. Samples of the structure were then tested for Heat Deflection Temperature using ASTM test D648. The data was then compared to Heat Deflection Temperature data obtained on a monolayer of the polyester/polycarbonate blend of Example 1, but without the polycarbonate UV cap layer. The results are reported in Table 4.

TABLE 4

| Test | Copolyester/polycarbonate with PC cap layer | Copolyester/polycarbonate blend mono layer |
|---|---|---|
| HDT ASTM D648 264 psi, 1.82 Mpa | 196° F./91° C. | 187° F./86° C. |
| HDT ASTM D648 66 psi, 0.455 Mpa | 207° F./97° C. | 196° F./91° C. |

From the above data in Table 4, it is observed that the multi-layer structure has higher HDT than that of the monolayer sheet without the polycarbonate cap layer. This feature can be a significant advantage to the sheet structure when used in high temperature applications such as for signs and vending machine faces among others.

Example 2

The procedure of Example 1 is followed with the exception that the UV cap layer material is substituted. In this Example 2, there is utilized as the polycarbonate UV cap layer, two other products, namely, Bayer polycarbonate containing Cyasorb 5411 UV absorber and Bayer polycarbonate containing Cyasorb 3638 UV absorber. It is expected that the resultant multi-layer structures will exhibit properties similar to those of the multi-layer structure of Example 1.

Example 3

The process of Example 1 is followed with the exception that another polycarbonate is utilized in preparing the copolyester/polycarbonate blend from which the bulk layer sheet is formed. In this example, there is utilized as the polycarbonate material, Bayer's Makrolon 2608 polycarbonate. It is expected that the properties of the multi-layer structure would be similar to that of the multi-layer structure of Example 1.

The invention has been described above in detail with particular reference to preferred embodiments thereof, but it will be understood that variations and modifications other than as specifically described herein can be effected within the spirit and scope of the invention. Moreover, all patents, patent applications, provisional patent applications, and literature references cited above are incorporated herein by reference for any disclosure pertinent to the practice of this invention.

We claim:

1. An ultraviolet protected multi-layer structure comprising:
    an ultraviolet protective layer comprising at least one, or more, ultraviolet absorbing compound and at least one, or more, first polycarbonate; and
    a polymeric layer adjacent to the ultraviolet protective layer, the polymeric layer comprising
        a blend comprising
            (A) from about 15 to about 40 weight percent, based on the total blend, of at least one second polycarbonate, and
            (B) from about 60 to about 85 weight percent, based on the total blend, of at least one copolyester comprising
                (a) an acid component comprising from about 65 to about 85 mol percent of a dicarboxylic acid selected from the group consisting of terephthalic acid, naphthalenedicarboxylic acid, 1,4-cyclohexanedicarboxylic acid and mixtures thereof; from about 15 to about 35 mol percent isophthalic acid; and from about 0 to about 20 mol percent of other dicarboxylic acid units having from about 4 to about 40 carbon atoms, wherein the total mol percent of dicarboxylic acid units is equal to 100 mol percent; and
                (b) a glycol component comprising from about 80 to 100 mol percent of 1,4-cyclohexanedimethanol and from 0 to about 20 mol percent of other glycol units having from about 3 to about 12 carbon atoms, wherein the total mol percent of glycol units is equal to 100 mol percent; wherein the total units of the copolyester is equal to 200 mol percent.

2. The multi-layer structure according to claim 1 wherein at least one copolyester has an inherent viscosity of from about 0.5 to about 1.5 dL/g, determined in accordance with ASTM Test Method D2857-70.

3. The multi-layer structure according to claim 1 wherein the acid component of the copolyester comprises terephthalic acid.

4. The multi-layer structure according to claim 1 wherein the glycol component of the copolyester comprises 100 mol percent of 1,4-cyclohexanedimethanol.

5. The multi-layer structure according to claim 1 wherein the copolyester comprises 100 mol percent 1,4-cyclohexanedimethanol, about 26 mol percent isophthalic acid, and about 74 mol percent terephthalic acid.

6. The multi-layer structure according to claim 1 wherein the blend further comprises a phosphite stabilizer.

7. The multi-layer structure according to claim 1 wherein the ultraviolet absorbing compound in the ultraviolet protective layer is present in an amount ranging from about 0.25 to about 15 weight percent.

8. The multi-layer structure according to claim 1 wherein the ultraviolet protective layer is adjacent to both surfaces of the polymeric layer.

9. A process for producing the multi-layer structure according to claim 1 comprising coextruding the ultraviolet protective layer and the polymeric layer.

10. An article of manufacture produced from the multi-layer structure according to claim 1.

* * * * *